United States Patent
Nakano et al.

(10) Patent No.: US 9,960,725 B2
(45) Date of Patent: May 1, 2018

(54) ELECTRIC COMPRESSOR

(71) Applicant: MITSUBISHI HEAVY INDUSTRIES AUTOMOTIVE THERMAL SYSTEMS CO., LTD., Aichi (JP)

(72) Inventors: Koji Nakano, Tokyo (JP); Hideo Nakamura, Tokyo (JP); Hiroyuki Kamitani, Aichi (JP)

(73) Assignee: MITSUBISHI HEAVY INDUSTRIES AUTOMOTIVE THERMAL SYSTEMS CO., LTD., Kiyosu-Shi (JP)

( * ) Notice: Subject to any disclaimer, the term of this patent is extended or adjusted under 35 U.S.C. 154(b) by 0 days. days.

(21) Appl. No.: 15/116,101

(22) PCT Filed: Feb. 26, 2015

(86) PCT No.: PCT/JP2015/055722
§ 371 (c)(1),
(2) Date: Aug. 2, 2016

(87) PCT Pub. No.: WO2015/137143
PCT Pub. Date: Sep. 17, 2015

(65) Prior Publication Data
US 2017/0187317 A1 Jun. 29, 2017

(30) Foreign Application Priority Data
Mar. 10, 2014 (JP) .................. 2014-046356

(51) Int. Cl.
*H02P 27/08* (2006.01)
*B60H 1/32* (2006.01)
(Continued)

(52) U.S. Cl.
CPC ........... *H02P 27/08* (2013.01); *B60H 1/3223* (2013.01); *H02K 9/005* (2013.01); *H02M 3/156* (2013.01);
(Continued)

(58) Field of Classification Search
CPC .... H02P 2201/109; H02P 27/08; H02P 27/06; H02P 7/5395; H02P 2201/07; H02M 3/1582; H02M 7/49
See application file for complete search history.

(56) References Cited

U.S. PATENT DOCUMENTS

2004/0020227 A1 2/2004 Takemoto et al.
2008/0223059 A1* 9/2008 Escanes Garcia .... F25B 49/025
62/230
(Continued)

FOREIGN PATENT DOCUMENTS

CN 1477354 A 2/2004
CN 101187364 A 5/2008
(Continued)

OTHER PUBLICATIONS

Office Action dated Jan. 22, 2018 in Chinese Patent Application No. 201580005851.8 with an English Translation.

*Primary Examiner* — Karen Masih
(74) *Attorney, Agent, or Firm* — Birch, Stewart, Kolasch & Birch, LLP

(57) ABSTRACT

An electric compressor comprises: a boost converter configured to boost a voltage output from a direct current power supply; an inverter configured to convert the power boosted by the boost converter to an alternating current power; and a motor configured to rotate the electric compressor using the AC power output from the inverter. In the electric compressor, the boost converter and the inverter are provided on the same circuit board, housed in the same inverter case, and cooled by a coolant flowing into the electric compressor. The electric compressor is thereby obtained in which the device size can be prevented from increasing even when the boost converter configured to boost a low voltage from the DC power supply is installed.

5 Claims, 5 Drawing Sheets

(51) Int. Cl.
*H02K 9/00* (2006.01)
*H02M 7/537* (2006.01)
*H02M 3/156* (2006.01)

(52) U.S. Cl.
CPC ..... *H02M 7/537* (2013.01); *B60H 2001/3292* (2013.01)

(56) References Cited

U.S. PATENT DOCUMENTS

| | | |
|---|---|---|
| 2010/0194219 A1 | 8/2010 | Hotta et al. |
| 2012/0076679 A1 | 3/2012 | Saito et al. |
| 2013/0119834 A1 | 5/2013 | Nakagami et al. |

FOREIGN PATENT DOCUMENTS

| | | |
|---|---|---|
| CN | 101689787 A | 3/2010 |
| CN | 102449305 A | 5/2012 |
| CN | 102480213 A | 5/2012 |
| CN | 103348138 A | 10/2013 |
| JP | 2003-25834 A | 1/2003 |
| JP | 2004-248362 A | 9/2004 |
| JP | 2005-155365 A | 6/2005 |
| JP | 2007-74818 A | 3/2007 |
| JP | 2008-61414 A | 3/2008 |
| JP | 2008-263755 A | 10/2008 |
| JP | 2012-210095 A | 10/2012 |

\* cited by examiner

COOLANT FLOW DIRECTION

ELECTRIC COMPRESSOR

TECHNICAL FIELD

The present invention relates to an electric compressor.

BACKGROUND ART

An automotive electric compressor is generally installed in a vehicle, such as an electric vehicle (EV), a hybrid electric vehicle (HEV), a plug-in hybrid electric vehicle (PHEV), and a fuel cell electric vehicle (FCEV).

In Patent Document 1, an electric compressor is disclosed that is provided with a power converter (an inverter) for converting a direct current (DC) voltage applied from an external source to a three-phase alternating current (AC) power, a motor for rotating a compressor using the three-phase AC power, and a compressor for compressing a coolant.

The type of DC voltage described in Patent Document 1 is supplied from a high voltage battery installed in the above-described vehicle, or from a DC/DC converter connected to the high voltage battery.

Although the range of the DC voltage varies depending on the type of the vehicle, many of the above-described vehicles, such as the EV, generally have a 300 V system (from 150 V to 450 V), which is a high voltage system. The current capacity of the DC voltage of the 300 V system is at most around 30 A in general. Thus, the size of an energized member also does not increase due to a relationship between the current and the temperature, so the electric compressor can be designed in a relatively compact manner.

In addition, with respect to engine vehicles also, environmental considerations, such as performing idling stop and the like, will become increasingly important. Thus, a demand for the electric compressor will be heightened, even for engine vehicles that are not provided with the high voltage battery.

However, the main purpose of a battery installed in the engine vehicle is to drive a control device, so the battery only supplies a low voltage, such as 12 V or 24 V. Note that, although the voltage of the battery may be increased up to approximately 50 V as a result of an increase in the number of installed electrical components, it is thought that only a few engine vehicle models will adopt a high voltage system as high as the 300 V system installed in the EV and the like.

Then, if an electric compressor having substantially the same capability as the 300 V system is driven by a 12 V low voltage system (12 V to 50 V), the energizing current is increased to approximately 300 A, which is approximately 10 times higher than the current used when the electric compressor is driven by the 300 V system. When an inverter of the electric compressor is configured while taking this into account, the cross-sectional area of the energized member needs to be increased to approximately 10 times that of a conventional energized member, since the temperature increases as a result of the increase in the current. As a result, the inverter of the electric compressor increases in size, and the inverter is not easily installed in an engine room or the like of the vehicle. Further, if an electric compressor is newly designed to be used with the 12 V system, design resources of the electric compressor using the 300 V system cannot be used, resulting in an increase in costs.

Thus, in Patent Document 2, an automotive electric compressor is disclosed that is provided with a boost converter that boosts a DC voltage output from a low voltage DC power supply to a high voltage and that uses the boosted DC voltage after converting the boosted DC voltage to AC voltage.

CITATION LIST

Patent Literature

Patent Document 1: Japanese Unexamined Patent Application Publication No. 2005-155365A
Patent Document 2: Japanese Unexamined Patent Application Publication No. 2003-25834A

SUMMARY OF INVENTION

Technical Problem

However, as disclosed in Patent Document 2, a design to newly install a boost converter in a vehicle engine room needs to take measures against noise for the boost converter, newly set an installation position of the boost converter, and have two types of cables for the 12 V low voltage system and the 300 V high voltage system, for example. In addition, fins and the like for cooling the boost converter are required to be newly provided. In this way, as a result of installing the boost converter, there is a possibility that the device size may increase.

In light of the foregoing, an object of the present invention is to provide an electric compressor capable of preventing the device size from increasing even when the boost converter configured to boost a low voltage from a DC power supply is installed.

Solution to Problem

An electric compressor of the present invention employs the following means to solve the problems described above.

An electric compressor according to a first aspect of the present invention includes: a boost converter configured to boost a voltage output from a direct current power supply; an inverter configured to convert the power boosted by the boost converter to an alternating current power; and a motor configured to rotate a compressor using the alternating current power output from the inverter. The boost converter and the inverter are provided on the same circuit board, housed in the same case, and cooled by a coolant flowing into the compressor.

According to the present configuration, the voltage output from the direct current power supply is boosted by the boost converter, and the boosted power is converted to the alternating current power by the inverter. Then, the motor rotates the compressor using the alternating current power output from the inverter.

Conventionally, both a direct current power supply of a high voltage system (a 300 V system, for example) for driving the motor via the inverter and a direct current power supply of a low voltage system (a 12 V system, for example) for controlling the inverter have been required. Meanwhile, with the present configuration, by providing the boost converter, a low voltage from the direct current power supply can be boosted to a high voltage. As a result, the number of power supply systems can be reduced to one. Further, by providing the boost converter and the inverter on the same circuit board, the number of accessory parts, such as connectors and communication parts, can be reduced, compared with a case in which the boost converter and the inverter are provided on different boards. In this way, an increase in size of the device configuration can be suppressed, even when the boost converter is installed.

Further, the boost converter and the inverter are housed in the same case and cooled by the coolant flowing into the compressor. In this way, fins and the like for cooling the boost converter are not required. Further, as a result of the boost converter and the inverter being housed in the same case, measures against electromagnetic noise, which is caused by installing the boost converter, can be implemented inside the same case.

Thus, with the present configuration, the device size can be prevented from increasing even when the boost converter configured to boost the low voltage from the direct current power supply is installed.

In the above-described first aspect, it is preferable that the inverter be arranged further to an upstream side of a flow of the coolant of the compressor than the boost converter.

According to the present configuration, by arranging the inverter, which generates more heat than the boost converter, further to the upstream side of the coolant flow, cooling effects can be enhanced.

In the above-described first aspect, it is preferable that a semiconductor element formed of a wide-band-gap semiconductor be used in the boost converter and as the inverter.

The present configuration allows the enhanced electric compressor, reduction in the device size, and the like.

In the above-described first aspect, it is preferable that various control signals for the boost converter and the inverter be generated by the same microcomputer.

According to the present configuration, since the boost converter can be controlled using calculation results with respect to the inverter while performing feedback control with respect to the inverter, tracking performance with respect to load fluctuations can be enhanced.

In the above-described first aspect, it is preferable that pulse width modulation control be performed with respect to the boost converter and the inverter, and that a pulse width modulation frequency of the boost converter be higher than a pulse width modulation frequency of the inverter.

According to the present configuration, by setting the boost converter to the higher pulse width modulation frequency than that of the inverter located on the motor (the load) side, the boost converter can respond to power fluctuation requirements from the inverter, thereby enabling an enhancement in the tracking performance with respect to the load fluctuations.

Advantageous Effects of Invention

According to the present invention, excellent effects are obtained by which the device size can be prevented from increasing even when the boost converter configured to boost the low voltage from the direct current power supply is installed.

DESCRIPTION OF EMBODIMENTS

An embodiment of an electric compressor according to the present invention will be described below with reference to the drawings.

Figure 1:
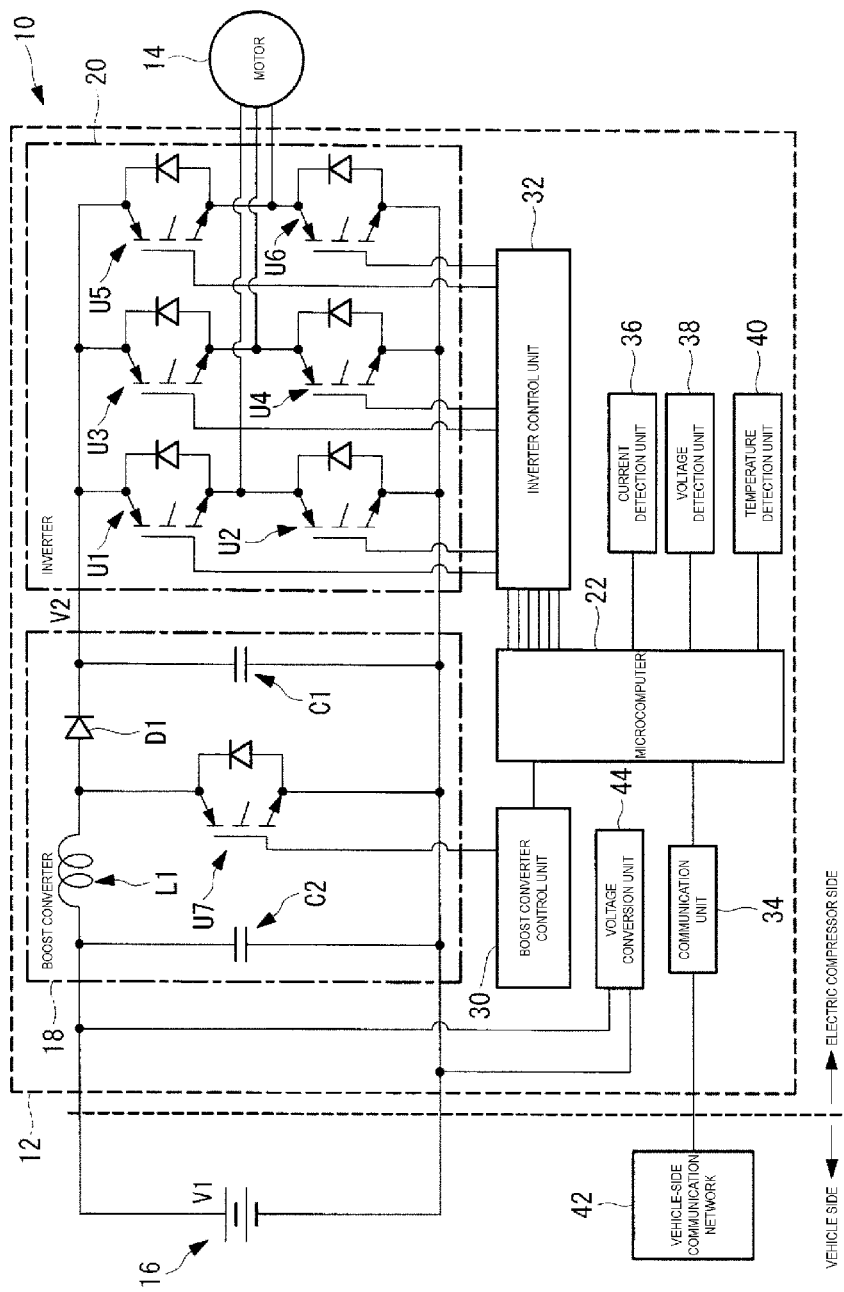
FIG. 1 is a configuration diagram of a power supply device according to an embodiment of the present invention.

An electrical configuration of a power supply device 12 of an electric compressor 10 will be described with reference to FIG. 1.

The power supply device 12 supplies power for driving a motor 14 configured to rotate a compressor using a three-phase alternating current (AC). As an example, the electric compressor 10 is used for an air conditioner of a vehicle. For example, the vehicle is an engine vehicle provided with a direct current (DC) power supply 16 that outputs a low voltage of a 12 V system (from 12 V to 50 V).

Note that the DC power supply 16 supplies power not only to the power supply device 12, but also to various other devices of the vehicle.

The motor 14 is a permanent magnet synchronous motor, for example.

The power supply device 12 includes a boost converter 18 that is a DC/DC converter configured to boost a DC voltage V1 output from the DC power supply 16, an inverter 20 configured to convert a DC voltage V2 boosted by the boost converter 18 to AC power and supply the AC power to the motor 14, and a microcomputer 22 that is a control device configured to control the boost converter 18 and the inverter 20.

Note that the microcomputer 22 performs pulse width modulation (PWM) control with respect to the boost converter 18 and the inverter 20.

One end of the boost converter 18 is connected to the DC power supply 16, and the other end of the booster converter 18 is connected to the inverter 20. The boost converter 18 boosts a voltage of the 12 V system, for example, to a high voltage of a 300 V system (150 V to 450 V), and outputs the high voltage to the inverter 20.

The boost converter 18 is provided with an inductor L1, a diode D1, and a power transistor U7.

The inductor L1 is connected to a positive electrode side of the DC power supply 16.

An anode of the diode D1 is connected to the inductor L1, and a cathode of the diode D1 is connected to the inverter 20.

One end of the power transistor U7 is connected to a connection point between the inductor L1 and the diode D1, and the other end of the power transistor U7 is connected to a negative electrode side of the DC power supply 16 and to the inverter 20. The power transistor U7 is a switching element for intermittently short-circuiting an output terminal of the inductor L1.

Further, in order to smooth the DC voltage, a smoothing capacitor C1 is provided on the inverter 20 side of the boost converter 18, and a smoothing capacitor C2 is provided on the DC power supply 16 side of the boost converter 18.

The inverter 20 converts the DC power output from the boost converter 18 to a three-phase AC power, and supplies the three-phase AC power to the motor 14.

The inverter 20 is provided with power transistors U1 to U6, which are switching elements.

The power transistors U1 and U2 are connected in series, and an emitter of the power transistor U1 and a collector of the power transistor U2 are connected to the motor 14 so as to cause a motor current Iu to flow to the motor 14. The power transistors U3 and U4 are connected in series, and an emitter of the power transistor U3 and a collector of the power transistor U4 are connected to the motor 14 so as to cause a motor current Iv to flow to the motor 14. The power transistors U5 and U6 are connected in series, and an emitter of the power transistor U5 and a collector of the power transistor U6 are connected to the motor 14 so as to cause a motor current Iw to flow to the motor 14.

The power transistors U1 to U7 and the diode D1, each of which is a semiconductor element, are each formed of a wide-band-gap semiconductor. The wide-band-gap semiconductor is formed of silicon carbide (SiC), gallium nitride (GaN), or the like, for example.

The wide-band-gap semiconductor formed of SiC, GaN, or the like can increase the switching speed of the power transistor. Thus, by using the wide-band-gap semiconductor, switching loss can be suppressed, and further, since the steady loss is also low, the electric compressor 10 can attain high efficiency.

Then, as a result of the increased switching speed, which is realized by using the wide-band-gap semiconductors as the power transistors U1 to U7, the power supply device 12 can perform higher frequency operations than a conventional power supply device using conventional Si-type power transistors. Therefore, by increasing the PWM frequencies of the boost converter 18 and the inverter 20, the capacities of the inductor L1 and the smoothing capacitors C1 and C2 can be reduced, thereby allowing the device size to be reduced.

Further, as a result of the boost converter 18 and the inverter 20 being able to perform the high frequency operations, the boost converter 18 and the inverter 20 can be operated at a frequency equal to or higher than the frequency audible by humans. In this way, discomfort to people caused by the sound formed by PWM frequency components of the boost converter 18 and the inverter 20 can be suppressed.

Further, by raising the PWM frequency of the inverter 20, ripple components of the input voltage and input current of the boost converter 18 are reduced, and as a result, electromagnetic radiation noise and power loss caused by the ripple components can be reduced. In addition, by raising the PWM frequency of the boost converter 18, a stable voltage is output to the inverter 20.

Further, as described below in detail, the boost converter 18 and the inverter 20 are provided on a same circuit board 56, housed in the same case (hereinafter referred as an "inverter case 50"), and cooled by a coolant flowing into a compressor 54 (see FIGS. 4 and 5).

Figure 2:
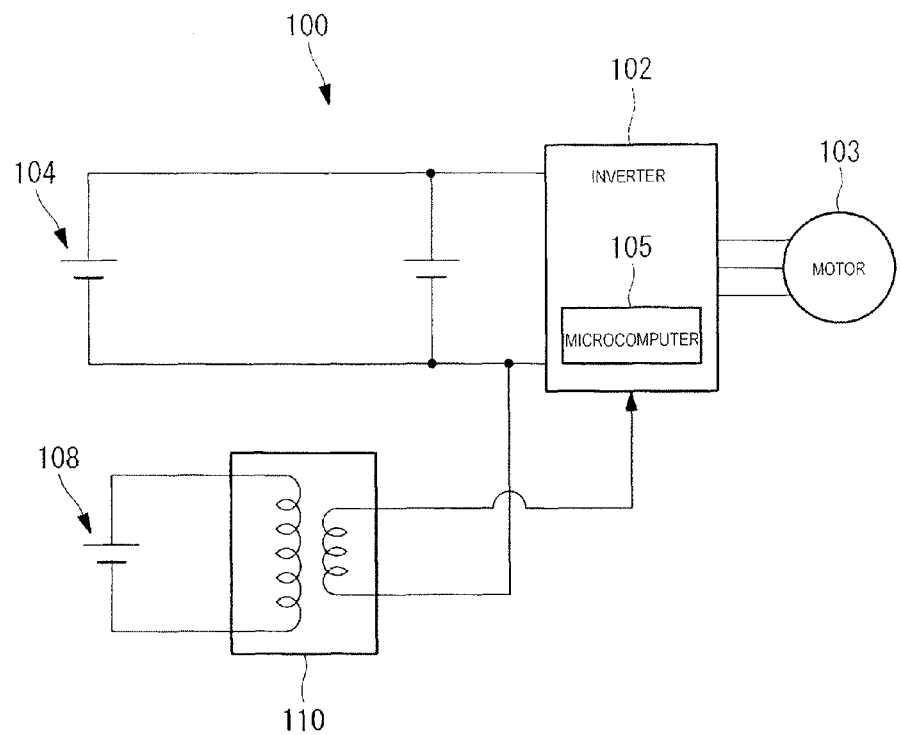
FIG. 2 is an electrical configuration diagram of a conventional power supply device.

Here, as illustrated in FIG. 2, a conventional electric compressor 100 requires a DC power supply 104 of a high voltage system (a 300 V system) for driving a motor 103 via an inverter 102 and a DC power supply 108 of a low voltage system (a 12 V system) for controlling the inverter 102 including a microcomputer 105 and the like.

On the other hand, as in the present embodiment, by providing the boost converter 18, the low voltage from the DC power supply 16 of the low voltage system can be boosted to a high voltage. As a result, the number of power supply systems can be reduced to one. Further, by installing the boost converter 18 and the inverter 20 on the same circuit board 56, the number of accessory parts, such as connectors and communication parts, can be reduced, compared with a case in which the boost converter 18 and the inverter 20 are installed on different circuit boards. In this way, an increase in size of the device configuration resulting from the new installation of the boost converter 18 can be suppressed.

Further, the boost converter 18 and the inverter 20 are housed in the same case, namely, the inverter case 50, and cooled by the coolant flowing into the compressor 54. In this way, fins and the like for cooling the boost converter 18 are not required to be newly provided. Further, as a result of the boost converter 18 and the inverter 20 being housed in the same inverter case 50, measures against electromagnetic noise, which is caused by installing the boost converter 18, can be taken inside the same case.

Therefore, with the electric compressor 10 according to the present embodiment, even when the boost converter 18 configured to boost the low voltage from the DC power supply 16 is provided therein, an increase in the device size can be suppressed.

Next, a control system of the power supply device 12 will be described.

The microcomputer 22 generates control signals for controlling ON/OFF of the power transistor U7 provided in the boost converter 18 and of the power transistors U1 to U6 provided in the inverter 20.

The microcomputer 22 is provided with a central processing unit (CPU), a random access memory (RAM), a computer readable recording medium such as a read only memory (ROM), and the like. Further, for example, a sequence of processing for performing various functions is stored on a recording medium or the like in the form of a program, and the various functions are performed by the CPU loading this program from the recording medium, storing the program into the RAM or the like, and executing information processing and calculation processing. Note that the program may be preinstalled in the ROM or other recording medium, may be provided in the form of being stored in a computer-readable recording medium, or may be distributed through wired/wireless communication means, for example. Examples of the computer-readable recording medium include a magnetic disk, a magneto-optical disk, a CD-ROM, a DVD-ROM, a semiconductor memory, and the like.

A boost converter control unit 30, an inverter control unit 32, a communication unit 34, a current detection unit 36, a voltage detection unit 38, and a temperature detection unit 40 are connected to the microcomputer 22.

A control signal of the power transistor U7 from the microcomputer 22 is input into the boost converter control unit 30, and on the basis of the control signal, the boost converter control unit 30 controls ON/OFF of the power transistor U7.

Control signals of the power transistors U1 to U6 from the microcomputer 22 are input into the inverter control unit 32, and on the basis of the control signals, the inverter control unit 32 controls ON/OFF of the power transistors U1 to U6.

The communication unit 34 is connected to a vehicle-side communication network 42, and, using a vehicle communication protocol, such as the controller area network (CAN) or the local interconnect network (LIN), outputs various control signals to the microcomputer 22, such as a rotational frequency command for the motor 14 generated by a vehicle-side microcomputer (hereinafter referred to as a "motor rotational frequency command").

The current detection unit 36 detects an input current of the inverter 20 (hereinafter referred to as an "inverter input current"), an input current of the boost converter 18 (hereinafter referred to as a "converter input current"), and a current flowing in the motor 14 (hereinafter referred to as a "motor current").

The voltage detection unit 38 detects a DC voltage output from the DC power supply 16, an input voltage of the inverter 20 (hereinafter referred to as an "inverter input voltage"), and an output voltage of the boost converter 18 (hereinafter referred to as a "converter output voltage").

The temperature detection unit 40 detects a temperature of each of the power transistors U1 to U7 and the diode D1, or an ambient temperature thereof.

Further, a voltage conversion unit 44 is provided in parallel with the power supply device 12. The voltage conversion unit 44 converts the voltage of the DC power supply 16 to 5 V or 15 V, for example, and supplies the converted voltage to the microcomputer 22, the boost converter control unit 30, the inverter control unit 32, the communication unit 34, various detection circuits, and the like.

Figure 3:
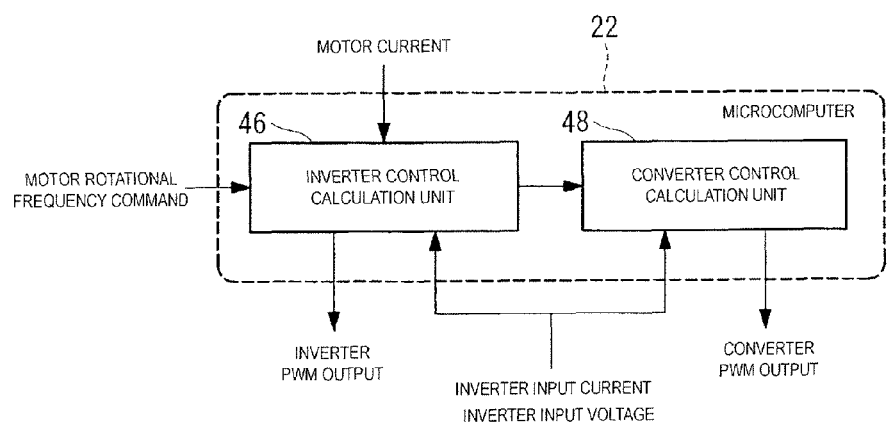
FIG. 3 is a functional block diagram of a microcomputer according to the embodiment of the present invention.

FIG. 3 is a functional block diagram of the microcomputer 22.

The microcomputer 22 is provided with an inverter control calculation unit 46 and a converter control calculation unit 48.

The motor rotational frequency command is input into the inverter control calculation unit 46 from the vehicle-side communication network 42 via the communication unit 34. Then, in accordance with the motor rotational frequency command, the inverter control calculation unit 46 performs calculations for generating the control signals for controlling ON/OFF of the power transistors U1 to U6. Note that the inverter control calculation unit 46 performs feedback control for correcting the control signals, using the detected inverter input current, motor current, and inverter input voltage (or converter output voltage) as necessary.

The control signals generated by the inverter control calculation unit 46 are output to the inverter control unit 32.

The converter control calculation unit 48 calculates a load (power, current and voltage) of the boost converter 18, using the inverter input current, the inverter input voltage (or the converter output voltage), or the calculation results such as an actual motor rotational frequency calculated by the inverter control calculation unit 46 on the basis of the motor rotational frequency command. Then, on the basis of the calculation result of the load, the converter control calculation unit 48 performs calculations for generating the control signal for controlling ON/OFF of the power transistor U7 provided in the boost converter 18.

The control signal generated by the converter control calculation unit 48 is output to the boost converter control unit 30.

In this way, as a result of the control signals for the boost converter 18 and the inverter 20 being calculated in the same microcomputer 22, the boost converter 18 can be controlled using the calculation results for the inverter 20, thereby enabling an enhancement in tracking performance with respect to load fluctuations.

Therefore, the boost converter 18 and the inverter 20 can be quickly controlled in response to the load fluctuations of the electric compressor 10 or to changes in the motor rotational frequency command from the vehicle side, and as a result, a stable and efficient motor control can be performed. Further, the microcomputer 22 may also adjust the control signals using the temperature detected by the temperature detection unit 40, and may perform a temperature protection operation while taking into account derating based on the temperature of each of the power transistors U1 to U7 and the diode D1.

Further, in the present embodiment, by using the power transistors U1 to U7 formed of the wide-band-gap semiconductors, the PWM frequency of the boost converter 18 becomes equal to or greater than 100 kHz, and the PWM frequency of the inverter 20 becomes equal to or greater than 40 kHz.

In this way, the PWM frequency of the boost converter 18 is set to be higher than the PWM frequency of the inverter 20.

This is because, by setting the boost converter 18 to a higher PWM frequency than that of the inverter 20, which is located on the motor 14 (the load) side, the boost converter 18 can respond to power fluctuation requirements from the inverter 20. As a result, the tracking performance with respect to the load fluctuations can be enhanced.

Further, the PWM frequency of the boost converter 18 may be changed in accordance with the operating state of the inverter 20. For example, when the fluctuations in the motor rotational frequency are small, the PWM frequency of the boost converter 18 is lowered, and when the fluctuations in the motor rotational frequency are large, the PWM frequency of the boost converter 18 is increased.

In this way, since the boost converter 18 and the inverter 20 are provided on the same circuit board 56 and controlled by the same microcomputer 22, control processing loss is suppressed, and the DC voltage V2 (the high voltage) can be appropriately generated in accordance with the operating state of the electric compressor 10.

Further, in the conventional example illustrated in FIG. 2, power is supplied from the DC power supply 104 of the 300 V system to drive the inverter 102, and power is supplied from the DC power supply 108 of the 12 V system to control the microcomputer 105 of the inverter 102. In this way, the electric compressor 100 is electrically connected to the 300 V system and the 12 V system, which are both provided outside of the electric compressor 100.

Thus, conventionally, it has been necessary to insulate the 300 V system and the 12 V system from each other to prevent an electric shock, and the ground lines of the 300 V system and the 12 V system have been separated using an insulation device 110, such as an insulated transformer, an isolator, and the like, in the inverter 102.

On the other hand, in the electric compressor 10 according to the present embodiment, since the high voltage system is only provided inside the electric compressor 10, there is no need to provide insulation as provided conventionally, and as a result, the number of parts required for the insulation can be reduced, and the circuit configuration can also be simplified.

Next, cooling of the boost converter 18 and the inverter 20 will be described.

Figure 4:
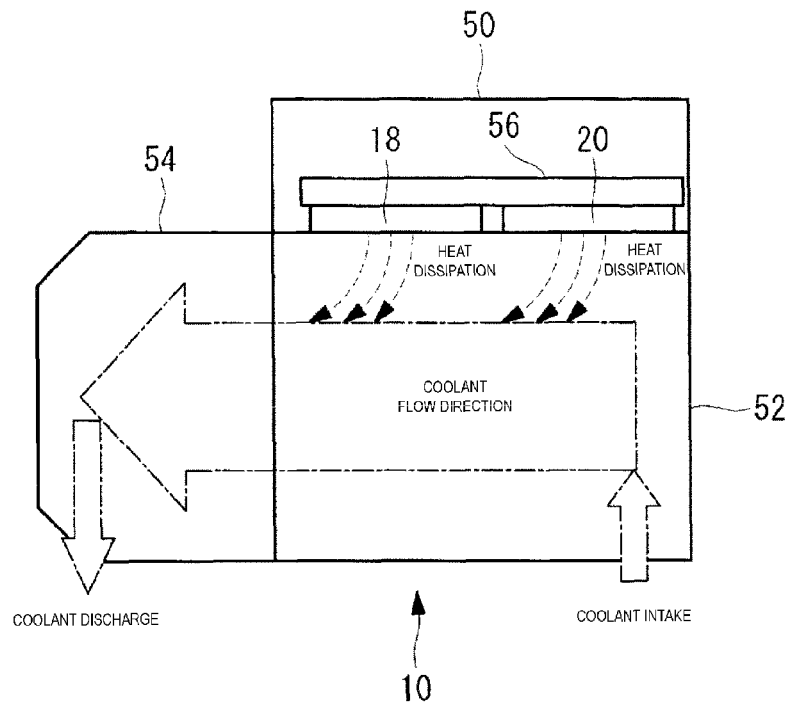
FIG. 4 is a schematic view illustrating an arrangement position of an inverter case according to the embodiment of the present invention.

FIG. 4 is a schematic view illustrating an arrangement position of the inverter case 50.

As illustrated in FIG. 4, the inverter case 50 is arranged on a side surface of a motor case 52 housing the motor 14, namely, in parallel with an axial direction of the motor 14.

The motor case 52 is provided with a coolant flow channel through which the coolant flowing into the compressor 54 flows, and in an example illustrated in FIG. 4, the coolant flows in from the right side of the motor case 52 and flows towards the left side thereof. Then, the boost converter 18 and the inverter 20 are cooled by the coolant via the inverter case 50.

Note that the power transistors U1 to U7 and the diode D1 provided in the boost converter 18 and the inverter 20 are attached directly to the motor case 52, or attached to the motor case 52 via a heat dissipating block such as a metal block.

When the power transistors U1 to U7 and the diode D1 are attached to the motor case 52 via the heat dissipating block, heat dissipation properties of the power transistors U1 to U7 and the diode D1 are enhanced by providing an appropriate configuration for enhancing heat conductivity, such as arranging an insulating heat dissipating sheet or a heat dissipating grease, between contact surfaces of the power transistors U1 to U7 and the diode D1 and the motor case 52 or the heat dissipating block.

Further, the inverter 20 is arranged further to the upstream side of the coolant flow of the compressor 54 than the boost converter 18.

The number of the power transistors U1 to U6 provided in the inverter 20 is greater than the number of the power transistor U7 and the diode D1 provided in the boost converter 18. Thus, the inverter 20 has a higher heat loss and generates more heat than the boost converter 18. Therefore, by arranging the inverter 20 on the coolant intake side, namely, on the upstream side of the coolant flow, cooling effects for the inverter 20 are improved.

In the example illustrated in FIG. 4, the inverter 20 is arranged near the coolant intake side on the right side of the drawing, and the boost converter 18 is arranged to the left of the inverter 20. As a result, the inverter 20, which generates more heat than the boost converter 18, and the boost converter 18 can be cooled in a balanced manner.

Figure 5:
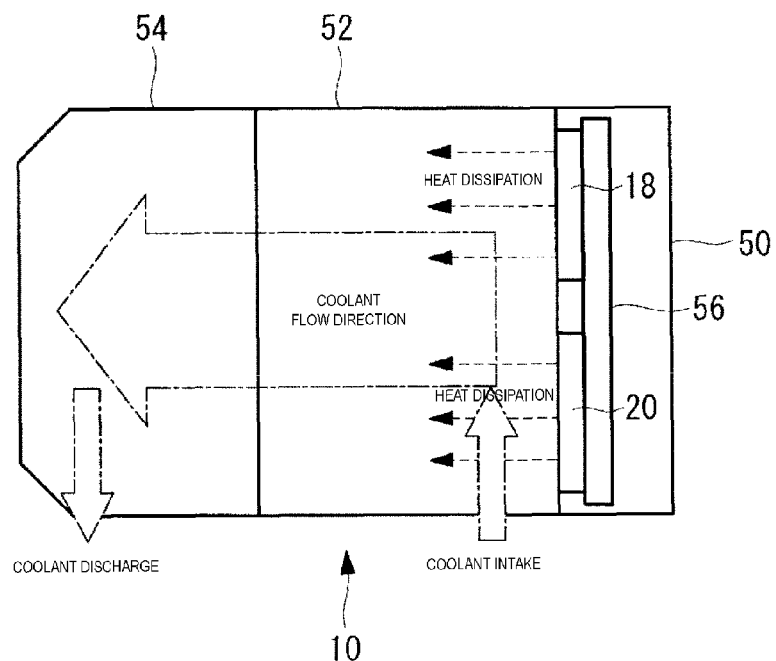
FIG. 5 is a schematic view illustrating an arrangement position of the inverter case according to another embodiment of the present invention.

FIG. 5 is a schematic view illustrating an arrangement position of the inverter case 50 according to another embodiment.

In an example illustrated in FIG. 5, the inverter case 50 is arranged on the bottom surface of the motor case 52, that is, so as to intersect the axial direction of the motor 14.

In the example illustrated in FIG. 5, the inverter 20 is arranged near the coolant intake side on the lower right side of the drawing, and the boost converter 18 is arranged on the upper side of the inverter 20.

Figure 6:
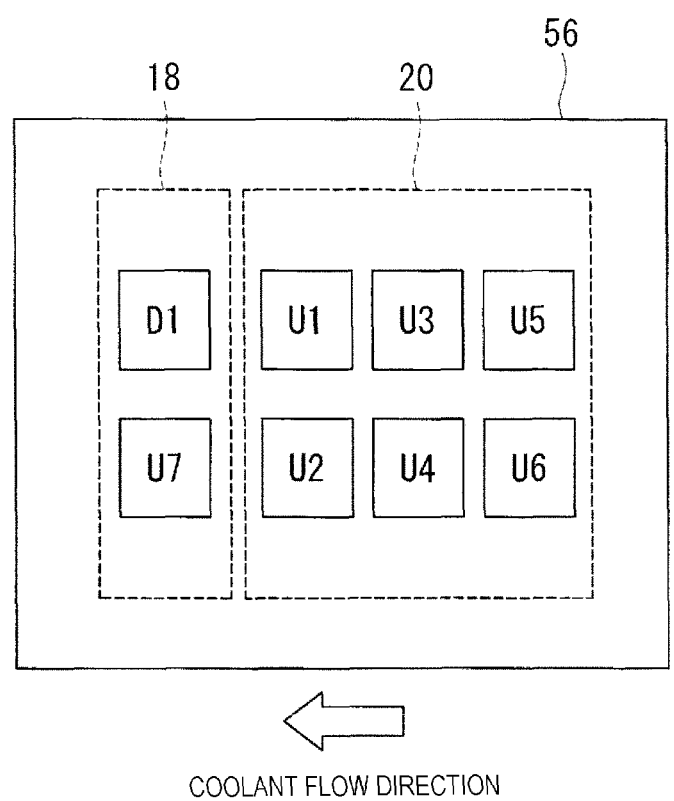
FIG. 6 is a schematic view illustrating arrangement positions of power transistors of an inverter and a power transistor and a diode of a boost converter on a circuit board according to the embodiment of the present invention.

FIG. 6 is a schematic view illustrating arrangement positions of the power transistors U1 to U6 of the inverter 20 and the power transistor U7 and the diode D1 of the boost converter 18, on the circuit board 56. Further, FIG. 7 is a circuit diagram illustrating a positive electrode line 60 and a negative electrode line 62 of a power supply system.

Figure 7:
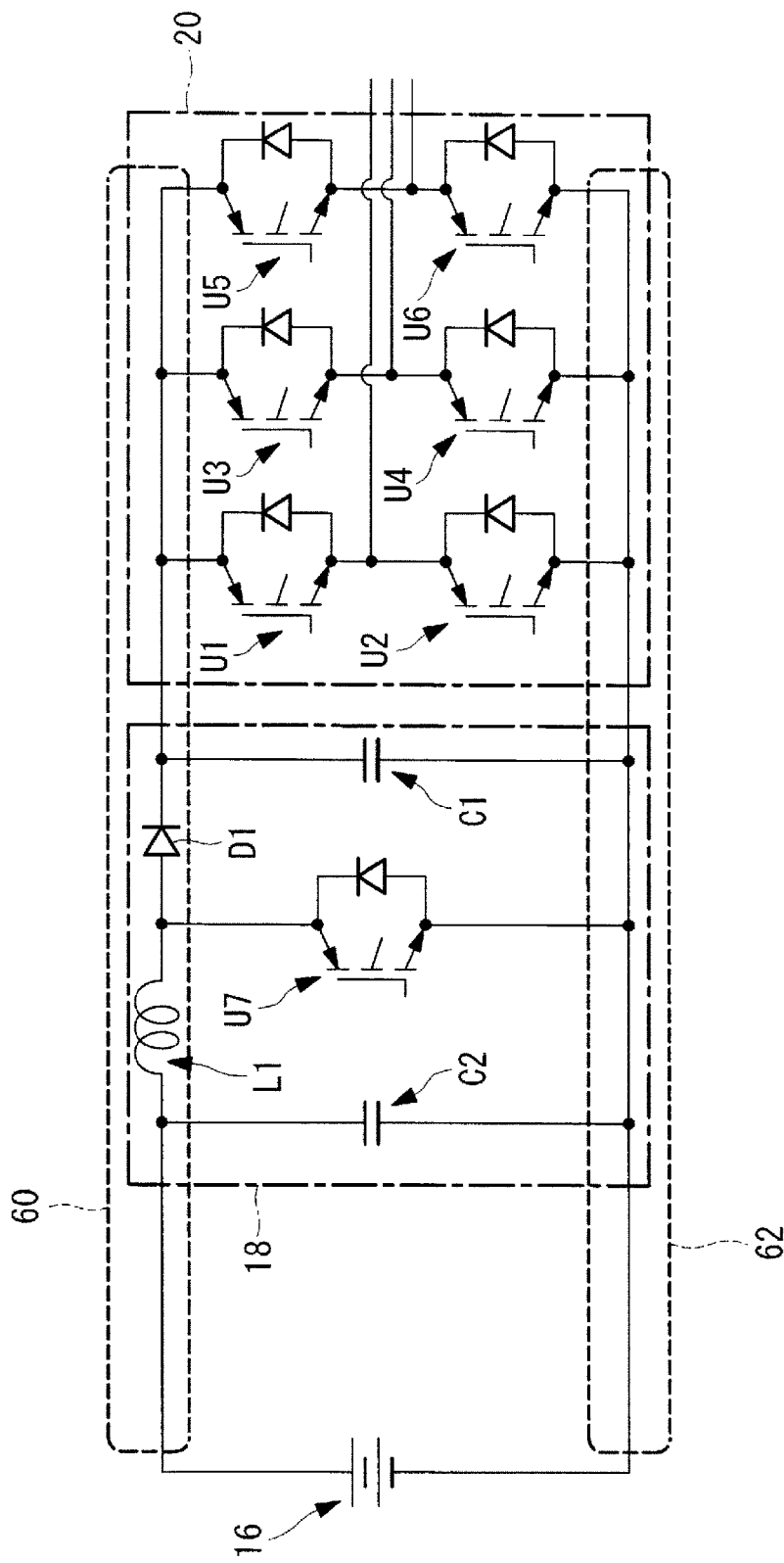
FIG. 7 is a circuit diagram illustrating a positive electrode line and a negative electrode line of a power supply system according to the embodiment of the present invention.

The boost converter 18 and the inverter 20 are divided into the positive electrode line 60 and the negative electrode line 62 in terms of the power supply system, as illustrated in FIG. 7. The diode D1 and the power transistors U1, U3, and U5 are each electrically connected to the positive electrode line 60 side, and the power transistors U7, U2, U4, and U6 are each electrically connected to the negative electrode line 62 side. Therefore, when taking this into account, it is preferable that the power transistors U1 to U7 and the diode D1 be arranged as illustrated in FIG. 6 in terms of the electrical configuration and also in terms of reducing the size of the circuit board 56.

In addition, since the arrangement illustrated in FIG. 6 coincides with an arrangement following the coolant flow, this arrangement is also effective in terms of the cooling by the coolant.

Further, the power transistors U1 to U7 and the diode D1 can be arranged in a standing state. In this way, the size of the board 56 can be further reduced.

As described above, the electric compressor 10 according to the present embodiment includes the boost converter 18 configured to boost the voltage output from the DC power supply 16, the inverter 20 configured to convert the power boosted by the boost converter 18 to the AC power, and the motor 14 configured to rotate the electric compressor 10 by the AC power output from the inverter 20. The boost converter 18 and the inverter 20 are provided on the same circuit board 56, housed in the same inverter case 50, and cooled by the coolant flowing into the electric compressor 10.

The electric compressor 10 is thereby obtained in which the device size can be prevented from increasing even when the boost converter 18 configured to boost the low voltage from the DC power supply 16 is installed.

The present invention has been described using the above-described embodiments, but the technical scope of the present invention is not limited to the scope of the above-described embodiments. Various modifications or improvements can be made to the above-described embodiments within a range that does not deviate from the intent of the invention, and those modes to which the modifications or improvements have been added are also included within the technical scope of the present invention.

REFERENCE SIGNS LIST

10 Electric compressor
14 Motor
18 Boost converter
20 Inverter
50 Inverter case
54 Compressor
56 Circuit board

The invention claimed is:

1. An electric compressor, comprising:
    a boost converter configured to boost a voltage output from a direct current power supply;
    an inverter configured to convert the power boosted by the boost converter to an alternating current power; and
    a motor configured to rotate a compressor using the alternating current power output from the inverter,
    the boost converter and the inverter being provided on the same circuit board, housed in the same case, and cooled by a coolant flowing into the compressor.

2. The electric compressor according to claim 1, wherein the inverter is arranged further to an upstream side of a flow of the coolant of the compressor than the boost converter.

3. The electric compressor according to claim 1, wherein a semiconductor element formed of a wide-band-gap semiconductor is used in the boost converter and the inverter.

4. The electric compressor according to claim 1, wherein various control signals for the boost converter and the inverter are generated by the same microcomputer.

5. The electric compressor according to claim 1, wherein pulse width modulation control is performed with respect to the boost converter and the inverter, and a pulse width modulation frequency of the boost converter is higher than a pulse width modulation frequency of the inverter.

* * * * *